United States Patent [19]
Ely et al.

[11] 3,799,267
[45] Mar. 26, 1974

[54] HYDRAULIC FRACTURING METHOD USING BENZOIC ACID TO FURTHER INCREASE THE VISCOSITY OF LIQUID HYDROCARBON

[75] Inventors: John W. Ely; Robert L. Tiner, both of Duncan, Okla.

[73] Assignee: Halliburton Company, Duncan, Okla.

[22] Filed: Nov. 21, 1972

[21] Appl. No.: 308,361

[52] U.S. Cl.............................. 166/308, 252/8.55 R
[51] Int. Cl.............................................. E21b 43/26
[58] Field of Search........... 166/308, 282, 283, 281; 252/8.55 R, 316

[56] References Cited
UNITED STATES PATENTS

| | | | |
|---|---|---|---|
| R23,733 | 11/1953 | Farris.................................. | 166/308 |
| 2,596,844 | 5/1952 | Clark................................... | 166/308 |
| 2,626,897 | 1/1953 | Young et al..................... | 252/316 X |
| 2,724,439 | 11/1955 | Brainerd, Jr....................... | 166/308 |
| 2,751,283 | 6/1956 | Van Strien et al......... | 252/8.55 R X |
| 2,763,621 | 9/1956 | Shulman............................ | 252/316 |
| 2,866,754 | 12/1958 | Cardwell et al................. | 252/316 X |
| 2,869,643 | 1/1959 | Schuessler et al.................. | 166/308 |
| 2,898,294 | 8/1959 | Priest et al...................... | 166/308 X |
| 3,406,115 | 10/1968 | White............................. | 166/308 X |

*Primary Examiner*—Stephen J. Novosad
*Attorney, Agent, or Firm*—Fred E. Hook; John H. Tregoning

[57] ABSTRACT

The viscosity of a liquid hydrocarbon is increased by first solvating an aluminum soap of an aliphatic carboxylic acid in the liquid hydrocarbon and thereafter dissolving benzoic acid therein. Viscous liquid hydrocarbons are particularly useful as fracturing fluids.

5 Claims, No Drawings

HYDRAULIC FRACTURING METHOD USING BENZOIC ACID TO FURTHER INCREASE THE VISCOSITY OF LIQUID HYDROCARBON

Hydraulic fracturing is a widely used method for stimulating petroleum producing subterranean formations and is commonly performed by contacting a subterranean formation with a viscous fracturing fluid having particulated solids, hereinafter referred to as propping agents, suspended therein, applying sufficient pressure to the fracturing fluid to open a fracture in the subterranean formation and maintaining this pressure while injecting the fracturing fluid into the fracture at a sufficient rate to extend the fracture into the subterranean formation. When the pressure on the fracturing fluid is reduced, the propping agent prevents the complete closure of the fracture.

Viscous liquids are desirably used as fracturing fluids because they have good fluid loss characteristics and a high resistance to flow through a fracture. Fracturing fluids with low fluid loss and a high resistance to flow through a fracture have been found to remain in the fracture long enough to permit buildup and maintenance of sufficient pressure to create a wide fracture extending into the subterranean formation. Additionally, a viscous fracturing fluid can support propping agents suspended therein to carry the propping agents into the fracture.

The viscosity of liquid hydrocarbon fracturing fluids is increased by a variety of thickening agents of which the aluminum soap of 2-ethylhexoic acid, hereinafter referred to as aluminum octoate, has been widely accepted. Aluminum octoate is a member of the class of basic metal soaps of aliphatic carboxylic acids which have been thoroughly investigated as agents to increase the viscosity of liquid hydrocarbons and is preferred because of its availability.

The present invention provides a method whereby the viscosity of a liquid hydrocarbon, having an aluminum soap of an oil soluble aliphatic carboxylic acid solvated therein, is unexpectedly increased by dissolving benzoic acid in the hydrocarbon liquid.

The addition of benzoic acid to a liquid hydrocarbon, having an aluminum soap of an oil soluble aliphatic carboxylic acid solvated therein, has been found to further increase the viscosity of the liquid hydrocarbon by as much as 100 times the viscosity produced by an equivalent concentration of the aluminum soap solvated therein. Additionally, it has been found that the addition of benzoic acid to certain liquid hydrocarbon crudes, having an aluminum soap of an oil soluble aliphatic carboxylic acid solvated therein, unexpectedly increases the viscosity of the hydrocarbon crudes to a sufficient viscosity such that the hydrocarbon crudes can be used as fracturing fluids.

A viscous liquid hydrocarbon produced by the method of this invention has the further unexpected property of having a reduced viscosity while being sheared and of regaining its viscosity when the shearing forces are reduced. A fracturing fluid having a reduced viscosity while being subjected to the shearing forces during displacement through the tubing and regaining its viscosity when it enters a fracture where the shearing forces are reduced can be displaced at high rates and can carry high concentrations of large propping agents into a fracture. Viscous fracturing fluids have also been found to create wide fractures extending into a subterranean formation.

Aluminum soaps of various aliphatic carboxylic acids useful for increasing the viscosity of liquid hydrocarbons are generally considered to be the aluminum soaps of oil soluble aliphatic carboxylic acids. Aliphatic carboxylic acids having less than about eight carbon atoms per molecule are generally not readily soluble in liquid hydrocarbons and aluminum soaps of these acids are generally solvated at an undesirably low rate. Examples of suitable oil soluble aliphatic carboxylic acids are octanoic acid, capric acid, lauric acid, myristic acid, palmitic acid, stearic acid, oleic acid, linoleic acid and 2-ethylhexoic acid. Other suitable oil soluble aliphatic carboxylic acids are napthalenic acids, cocoanut oil fatty acids, peanut oil fatty acids, and palm oil fatty acids. Of the aluminum soaps of these acids, the basic aluminum soap of 2-ethylhexoic acid is preferred because of its availability.

The solvation rate of these aluminum soaps is increased by the addition of an oil soluble aliphatic carboxylic acid to the liquid hydrocarbon. Examples of oil soluble acids suitable for increasing the solvation rate of liquid hydrocarbons for these aluminum soaps are octanoic acid, capric acid, lauric acid, myristic acid, palmitic acid, stearic acid, oleic acid, linoleic acid and 2-ethylhexoic acid.

These aluminum soaps will increase the viscosity of most liquid hydrocarbons; however, it has been found that these aluminum soaps are not readily solvated by liquid hydrocarbons having less than about five carbon atoms per molecule of hydrocarbon crudes having an API (American Petroleum Institute) gravity of less than about 40°. It has also been found that water and surface active agents mixed with liquid hydrocarbons reduce the viscosity increasing efficiency of these aluminum soaps.

The concentration of these aluminum soaps required for increasing the viscosity of liquid hydrocarbons for a fracturing fluid depends on the liquid hydrocarbon and the aluminum soap but is generally within the concentration range of about 0.5 to about 1.0 parts by weight aluminum soap per 100 parts by weight liquid hydrocarbon. However, there is no critical lower limit to the amount of aluminum soap required for increasing the viscosity of liquid hydrocarbons since the viscosity of the liquid hydrocarbon increases in proportion to the concentration of aluminum soap solvated by the liquid hydrocarbon.

Benzoic acid dissolved in the liquid hydrocarbon after the aluminum soap has been solvated by the liquid hydrocarbon has been found to further increase the viscosity of the liquid hydrocarbon in proportion to the concentration of benzoic acid dissolved in the liquid hydrocarbon. However, high concentrations of benzoic acid have been found to initially further increase the viscosity of liquid hydrocarbons having an aluminum soap solvated therein, but thereafter to reduce the viscosity of the liquid hydrocarbon mixture below its original viscosity value. The maximum concentration of benzoic acid which can be used to further increase the viscosity of the liquid hydrocarbon depends on the concentration of aluminum soap and the liquid hydrocarbon but is generally less than about 20 parts by weight benzoic acid per 100 parts by weight aluminum soap. The minimum concentration of benzoic acid required to further increase the viscosity of a liquid hydrocarbon depends on the concentration of aluminum soap and the liquid hydrocarbon but is generally greater than about 10 parts by weight benzoic acid per 100 parts by weight aluminum soap. The concentration of benzoic acid to further increase the viscosity of a liquid hydrocarbon, having aluminum octoate solvated therein, is within the range of about 12.5 to 17.5 parts by weight benzoic acid per 100 parts by weight aluminum octoate.

The examples are given primarily for the purpose of illustration and the invention in its broader aspect is not to be construed as limited thereto.

EXAMPLE I

Benzoic acid is dissolved in one liter of No. 2 diesel oil having 4.8 grams of aluminum octoate and 3 milliliters of an oil soluble fatty acid solvated therein to determine the effect of benzoic acid concentration on viscosity. Viscosity is measured with a Brookfield revolving viscometer with a No. 2 spindle at 6 r.p.m. and is shown on Table 1 as viscosity in centipoises. The oil soluble fatty acid used in Example I and the following examples is a by-product of the paper industry and contains oleic acid as a major component.

TABLE 1

Effect of benzoic acid on the viscosity of liquid hydrocarbon having aluminum octoate solvated therein

| Benzoic Acid (parts by Weight Benzoic Acid per 100 parts by weight aluminum octoate) | Viscosity (cps) |
| --- | --- |
| 0 | 250 |
| 2.5 | 250 |
| 5.0 | 250 |
| 7.5 | 250 |
| 10.0 | 250 |
| 12.5 | 350 |
| 15.0 | 2600 |
| 17.5 | 5000 |
| 20.0 | 1200 |
| 22.5 | 500 |
| 25.0 | 100 |

The data on Table 1 indicates that concentrations of benzoic acid above about 10 parts by weight benzoic acid per 100 parts by weight aluminum octoate will further increase the viscosity of liquid hydrocarbons having an aluminum soap of an oil soluble aliphatic carboxylic acid solvated therein, and that concentrations of benzoic acid above about 20 parts by weight benzoic acid per 100 parts by weight aluminum soap of an oil soluble aliphatic carboxylic acid have a viscosity reducing effect and can reduce the viscosity below the initial viscosity of the liquid hydrocarbon having the aluminum soap solvated therein.

EXAMPLE II

The viscosity of 250 milliliters of kerosene having 1.2 gram of aluminum octoate and 0.75 milliliter of an oil soluble fatty acid solvated therein is further increased by dissolving 0.18 gram of benzoic acid in the kerosene. The viscosity of the kerosene before dissolving the benzoic acid therein is 1,200 centipoises and is greater than 5,000 centipoises after dissolving the benzoic acid therein. Viscosity is measured with a Brookfield viscometer as in Example I.

EXAMPLE III

The viscosity of 250 milliliters of Calbaugh crude (Wyoming) having 1.2 gram of aluminum octoate and 0.75 milliliter of an oil soluble fatty acid solvated therein is further increased by dissolving 0.21 gram of benzoic acid in the Calbaugh crude. The viscosity of the Calbaugh crude before dissolving the benzoic acid therein is 40 centipoises and is greater than 1,300 centipoises after dissolving the benzoic acid therein. Viscosity is measured with a Brookfield viscometer as in Example I.

EXAMPLE IV

The viscosity of 250 milliliters of San Andres crude (West Texas) having 1.5 gram of aluminum octoate and 0.75 milliliter of an oil soluble fatty acid solvated therein is further increased by dissolving 0.27 gram of benzoic acid in the San Andres crude. The viscosity of the San Andres crude before dissolving the benzoic acid therein is 115 centipoise and is greater than 1,250 centipoises after dissolving the benzoic acid therein. Viscosity is measured with a Brookfield viscometer as in Example I.

EXAMPLE V

The viscosity of 250 milliliters of Clearfork crude (New Mexico) having 1.80 gram of aluminum octoate and 0.75 milliliter of an oil soluble fatty acid solvated therein is further increased by dissolving 0.18 gram of benzoic acid in the Cleakfork crude. The viscosity of the Clearfork crude before dissolving the benzoic acid therein is 25 centipoises and is not further increased by the addition of benzoic acid. Viscosity is measured with a Brookfield viscometer as in Example 1.

EXAMPLE VI

The viscosity of 250 milliliters of Marchand crude (Oklahoma) having 1.2 gram of aluminum octoate and 0.75 milliliter of an oil soluble fatty acid solvated therein is further increased by dissolving 19.5 grams of benzoic acid in the Marchand crude. The viscosity of the Marchand crude before dissolving the benzoic acid therein is 400 centipoises and is greater than 5,000 centipoises after dissolving the benzoic acid therein. Viscosity is measured with a Brookfield viscometer as in Example I.

EXAMPLE VII

Various chemicals are incrementally dissolved in 250 milliliters of kerosene having 1.2 gram of aluminum octoate and 0.75 gram of an oil soluble fatty acid solvated therein to determine the viscosity increasing characteristics of these chemicals. These chemicals are napthenic acid, ortho-toluic acid, para-toluic acid, salicylic acid, phthalic acid, stearic acid, anisic acid, para-hydroxy-benzoic acid, naphthalene, benzene, toluene, xylene, phenol, sodium benzoate, and methyl benzoate. These chemicals are each incrementally added at a concentration of 0.3 gram to 250 milliliters of kerosene having aluminum octoate solvated therein and none further increases the viscosity of the kerosene.

EXAMPLE VIII

Benzoic acid is substituted for varying concentrations of 2-ethylhexoic acid while producing the aluminum soap to determine if benzoic acid will provide the additional viscosity when added at the soap forming step. These aluminum soaps are tested by solvating 1.2 gram of each aluminum soap and 0.75 milliliter of an oil soluble fatty acid in 250 milliliters of kerosene and measuring the viscosity with a Brookfield viscometer as in Example I. The viscosity of kerosene having the various aluminum soaps solvated therein is shown on Table 2.

TABLE 2

The Viscosity of Mixed Aluminum Soaps of 2-ethylhexoic Acid and Benzoic Acid Solvated in Kerosene

| Aluminum Soap | | |
|---|---|---|
| Parts by Weight 2-ethylhexoic acid per 100 parts by Weight Acid | Parts by Weight Benzoic Acid per 100 Parts by Weight Acid | Viscosity (cps) |
| 100 | 0 | 1250 |
| 98 | 2 | 2250 |
| 96 | 4 | 1125 |
| 94 | 6 | 2500 |
| 92 | 8 | 2300 |
| 90 | 10 | 3750 |
| 88 | 12 | 2000 |
| 86 | 14 | 2250 |
| 80 | 20 | 3500 |

The data on Table 2 indicates that benzoic acid can be substituted for a portion of 2-ethylhexoic acid while producing the aluminum soap to increase the viscosity of a hydrocarbon liquid to a viscosity about three times higher than produced by an equivalent concentration of aluminum octoate.

It will be apparent that many widely different embodiments of this invention may be made without departing from the spirit and scope thereof and therefore it is not intended to be limited except as indicated in the appended claims.

What is claimed is:

1. A method of fracturing a subterranean formation, comprising the steps of:

contacting the subterranean formation with a fracturing fluid produced by first solvating a basic aluminum soap of oil soluble aliphatic carboxylic acids in liquid hydrocarbon to increase the viscosity of said liquid hydrocarbon and thereafter dissolving benzoic acid in said liquid hydrocarbon to further increase the viscosity of said liquid hydrocarbon;

applying sufficient pressure to said fracturing fluid to open a fracture in the formation; and maintaining said pressure while injecting said fluid into said fracture at a sufficient rate to extend said fracture into the formation.

2. The method of claim 1 wherein said carboxylic acid is 2-ethylhexoic acid.

3. The method of claim 1 wherein the concentration of said aluminum soap solvated in the liquid hydrocarbon is within the range of about 0.5 to 1.0 parts by weight of said aluminum soap per 100 parts by weight liquid hydrocarbon.

4. The method of claim 1 wherein the concentration of benzoic acid dissolved in the liquid hydrocarbon is less than about 20 parts by weight benzoic acid per 100 parts by weight aluminum soap.

5. The method of claim 4 wherein the concentration of benzoic acid dissolved in the liquid hydrocarbon is greater than about 10 parts by weight benzoic acid per 100 parts by weight aluminum soap.

* * * * *